United States Patent [19]

Graham et al.

[11] Patent Number: 4,664,218
[45] Date of Patent: May 12, 1987

[54] SAFETY BACK-UP SYSTEM FOR VEHICLES

[75] Inventors: George A. Graham, Napa, Calif.; Leonard R. Dearth, Appleton, Wis.

[73] Assignee: National Emstop, Inc., San Ramon, Calif.

[21] Appl. No.: 658,180

[22] Filed: Oct. 5, 1984

[51] Int. Cl.[4] .......................................... B60K 28/04
[52] U.S. Cl. ..................................... 180/272; 180/273
[58] Field of Search ..................... 180/272, 273, 275

[56] References Cited

U.S. PATENT DOCUMENTS

| | | | |
|---|---|---|---|
| 3,177,481 | 4/1965 | Joy et al. | 180/273 |
| 3,487,451 | 12/1969 | Fontaine | 180/273 |
| 3,763,975 | 10/1973 | Fontaine | 180/273 |
| 3,838,748 | 10/1974 | Gray et al. | 180/273 |
| 4,083,424 | 4/1978 | Stemmen et al | 180/272 |
| 4,136,752 | 1/1979 | Friesen et al. | 180/273 |
| 4,392,544 | 7/1983 | Dilno | 180/273 |

*Primary Examiner*—Ira S. Lazarus
*Attorney, Agent, or Firm*—Thomas M. Freiburger

[57] ABSTRACT

A safety back-up system for a vehicle automatically applies the brakes to stop the vehicle against reverse movement when the vehicle begins moving backward without an attendant at the rear of the vehicle. The system senses reverse motion of the vehicle, whether rolling backward down an incline or driven backward by the engine and automatically applies the brakes, unless the automatic braking is disabled by application of a manual input by an attendant positioned near the rear of the vehicle with a handheld signal transmitter. A manual override device is available to the vehicle's driver, enabling the driver to override the automatic braking device from inside the vehicle when necessary. A record may be kept in a computer memory of all uses of the manual override, to assure that the system is not defeated. A driver seat switch may also be included, independent of the driver's override switch, for also applying the brakes if the driver leaves the seat while the vehicle is stationary, moving backward or moving slowly forward.

14 Claims, 9 Drawing Figures

ARROW INDICATES THE DIRECTION OF
MOTION OF THE MAGNET AS VIEWED
FROM THE REAR OF THE VEHICLE

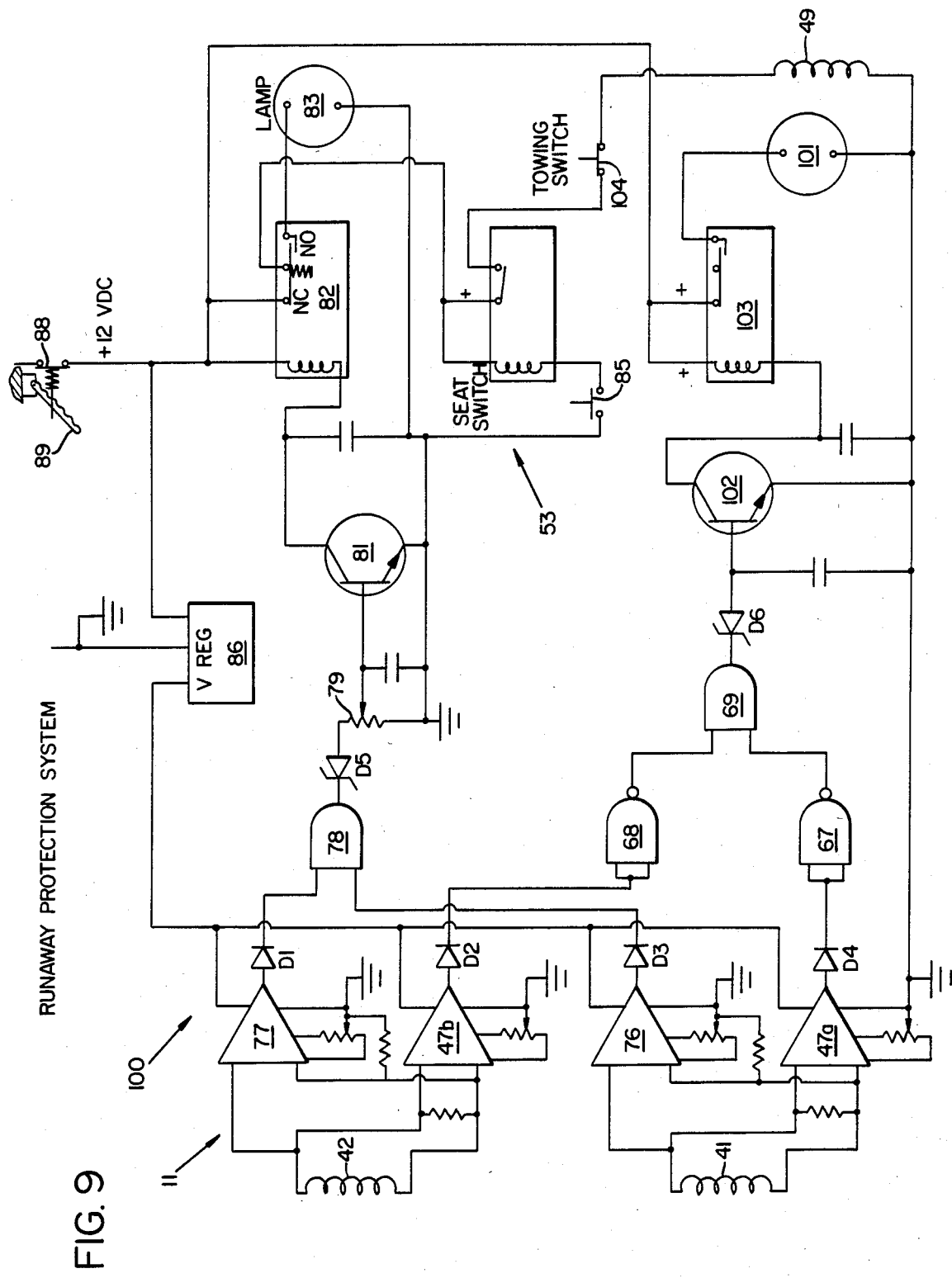

SAFETY BACK-UP SYSTEM FOR VEHICLES

BACKGROUND OF THE INVENTION

The invention relates to vehicle safety, and more particularly to a safety back-up system for normally preventing any backward movement of a vehicle such as a dump truck or a garbage truck unless an attendant is near the rear of the vehicle directing its movement, and to an associated system for stopping a moving vehicle whenever the driver leaves the seat, to prevent runaway accidents.

Trucks such as garbage trucks and dump trucks are known to collide rather frequently with stationary objects and structures behind the truck when the truck is backing up while on the job. Regulations of municipalities or of the trucking companies themselves normally require an attendant to be standing near the rear of the vehicle whenever it is being backed up, to direct the movement of the vehicle and avoid any such collisions. However, these rules are often circumvented for expediency, and the cumulative damage resulting from collisions from non-observance of these rules has been surprisingly large. One garbage disposal firm in the San Francisco Bay Area has experienced approximately 70 to 80 back-up accidents per month.

One attempted solution to this problem was a system marketed by Global Fabrications of Ontario, Canada. The system, mounted on a garbage truck or other vehicle, sensed objects approximately 45 inches to 50 inches behind the rear of the truck when the truck was moving backward, and automatically locked the brakes in response to sensing such objects. However, the system was not really practical on rear end loading trucks, and also the sensor and brake application device was only active when the truck was in reverse gear, excluding instances of rolling back on an incline, whether deliberately or by accident, without the truck being in gear. Moreover, the driver may actually want to back his vehicle to within a foot or two of an object or structure, which the prior art system would not permit, and a system of this sort really could not solve the real problem of assuring that the vehicle is properly directed from behind while backing.

The following prior art patents have some pertinence to the present invention: U.S. Pat. Nos. 4,142,152, 3,728,676, 3,783,339, 2,606,281, 2,961,640, 4,013,875 and 4,158,833. U.S. Pat. Nos. 4,142,152 and 3,728,676 disclose motion sensing arrangements for use on vehicles, including means for sensing motion via the rotation of a shaft in the reverse direction. The latter of these two patents discloses activation of a back-up alarm in response to sensing of reverse movement. U.S. Pat. No. 3,783,339 also signals the direction of travel of a vehicle, and the disclosed system is effective to apply brakes under certain conditions. U.S. Pat. No. 2,606,281 discloses a vehicle signalling device particularly for railroads, wherein the condition at a crossing is signalled to the moving train. If no signal is received to indicate a desired condition, the train's brakes are automatically applied. U.S. Pat. No. 4,013,875 shows an automatic vehicle control system including a back-up system with a form of override available to the operator.

Although several of the devices of the prior patents accomplish similar ends as in the present invention with respect to detecting backing motion in a vehicle, the principles involved in that motion detection are different from the present invention. In particular, U.S. Pat. Nos. 3,728,676 and 4,142,152 employ reed switches for sensing magnetic field from a permanent magnet which they pass. This differs from the present invention in structure and principle.

Moreover, no prior vehicle reverse sensing device has incorporated the other important features of the system of the present invention described below, for providing a reliable safety device for preventing back-up accidents and runaway accidents in service vehicles such as garbage trucks.

SUMMARY OF THE INVENTION

The present invention prevents backing accidents in vehicles such as garbage trucks and dump trucks by assuring that an attendant is behind the vehicle to direct the backing movement, as required. The system includes a motion-sensing device connected to the vehicle for detecting rearward movement of the vehicle, and braking means for automatically applying and locking the brakes in response to the detection of rearward movement of the vehicle by the motion-sensing means. An interrupt means is included for disabling the automatic braking means in response to and for the duration of application of a manual input by an observing person positioned near the rear of the vehicle. The interrupt means leaves the vehicle's manual braking system still operable. By this arrangement, the observing person is normally required to be in the vicinity of the rear of the vehicle in order for the vehicle to be capable of moving backward, and accidents due to absence of such an attendant are avoided.

The system preferably also includes a manual override means operable by the vehicle's driver, for enabling the driver to override the automatic braking means from inside the vehicle when necessary, such as circumstances of normal driving wherein movement in reverse is required and the attendant should not be required to be behind the vehicle.

The system may further include a recording device in the vehicle, for recording all instances and duration of the driver's use of the manual override device. Another feature preferably included in the system of the invention is a system disabling means for de-energizing the system to prevent the automatic application of the brake whenever the vehicle is moving forward faster than a preselected speed, which may be about five miles per hour. This minimizes the possibility of the brakes being inadvertently set while the vehicle is in forward motion, due to component failure or other reasons.

A further safety feature that may be included is a driver's seat pressure switch that senses the presence of the driver. If the driver leaves the seat while the vehicle is stationary or moving slowly forward (below the forward speed at which the disabling means de-energizes the system), the brakes are automatically applied, preventing runaway accidents. If the driver leaves the seat while the vehicle is in reverse motion, the brake relay will be activated even though it has been deactivated by the driver's override switch. If the forward motion of the vehicle is above the speed at which the braking circuit is disabled, then the seat switch has no effect.

It is therefore among the objects of the invention to provide a vehicle back-up safety system which detects any form of rearward motion of a vehicle such as a garbage truck, whether in gear or not, and automatically applies the brakes unless an attendant is behind the vehicle directing the backing, and including other override and safety features which make the system feasible for normal operations of the truck. These and other objects, advantages, features and characteristics of the invention will be apparent from the following description of a preferred embodiment, considered along with the accompanying drawings.

DESCRIPTION OF THE DRAWINGS

FIG. 9 is a schematic diagram similar to FIG. 7 but indicating a runaway prevention subsystem alone, without the other features of the invention.

DESCRIPTION OF PREFERRED EMBODIMENTS

Figure 1:
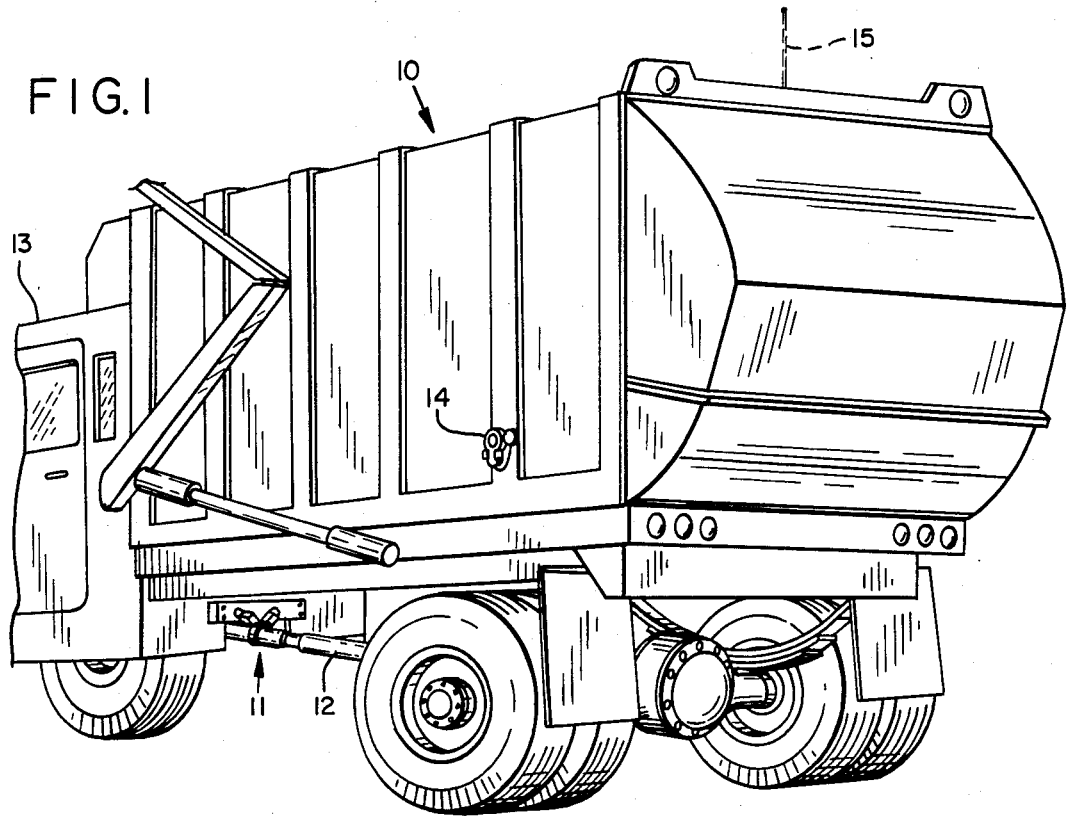
FIG. 1 is a perspective view showing a truck, such as a garbage truck, incorporating the safety back-up system of the invention.

Function of the System:

In the drawings, FIG. 1 shows a truck 10 such as a garbage truck, incorporating the safety braking system of the present invention and showing the location of several components. A motion detection subsystem 11 is indicated, associated with the truck's drive shaft 12, below and behind the cab 13 of the vehicle. A hand-held signal transmitter 14 is shown on the side of the truck near its rear. An optional antenna 15 is indicated in dashed lines, for receiving signals if the hand-held transmitter 14 is a radio frequency transmitter.

Figure 2:
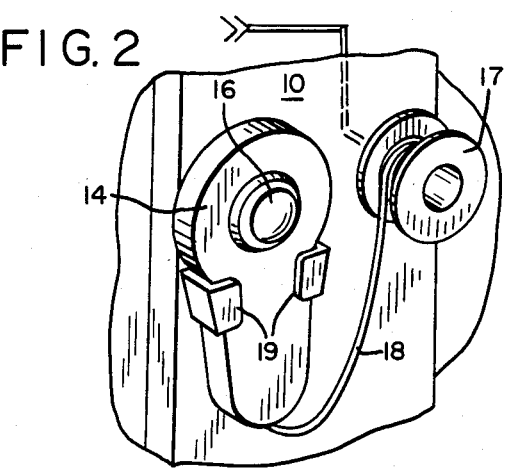
FIG. 2 is an enlarged view showing the hand-held signal switch of the interrupt device, in one form wherein it is connected to the vehicle by a reel-mounted electrical wire.

FIG. 2 shows in enlarged view the signal transmitter 14, in the form of a hand-held switch with a spring-loaded activation button 16, preferably of the normally open type, and including a truck-mounted reel 17 of electrical cord 18 connected to the switch 14. The rear switch 14 and retractable cord 18 permit releasing of the brakes, or interrupting of the automatic braking function, by a person located near the rear of the vehicle and directing the backing of the vehicle. The cord 18 permits the attendant to move a limited distance from the back of the truck, e.g. 10 to 15 feet. It should not be operable by the driver. Preferably, the cord reel 17 is spring-loaded to retract the cord 18 when the attendant returns the hand-held switch 14 to the truck, to replace it in an appropriate holder such as brackets 19 shown in FIG. 2.

Figure 3:
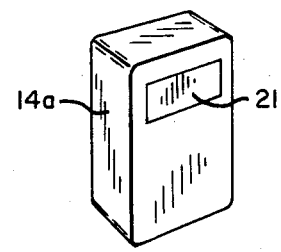
FIG. 3 is a view similar to FIG. 2, but showing a hand-held signal transmitter for the interrupt device for remote control of the interrupt function.

FIG. 3 shows an alternate form of hand-held signal transmitter 14a, comprising a remote radio frequency transmitter with a spring-loaded activation button 21, similar to the transmitter of a garage door opener. The signal from the radio transmitter unit 14a is received by the antenna 15 shown in dashed lines in FIG. 1. The transmitter 14a is of very limited range and the antenna 15 is positioned on the truck such as to prevent the transmitter 14a from being effective anywhere but in close proximity to the rear of the vehicle. In particular, the transmitter 14a should not be effective from inside the cab 13 of the truck. Other alternative types of remote switch arrangement can be employed, such as audio freuency or a photoreceptor and light source.

Figure 4:
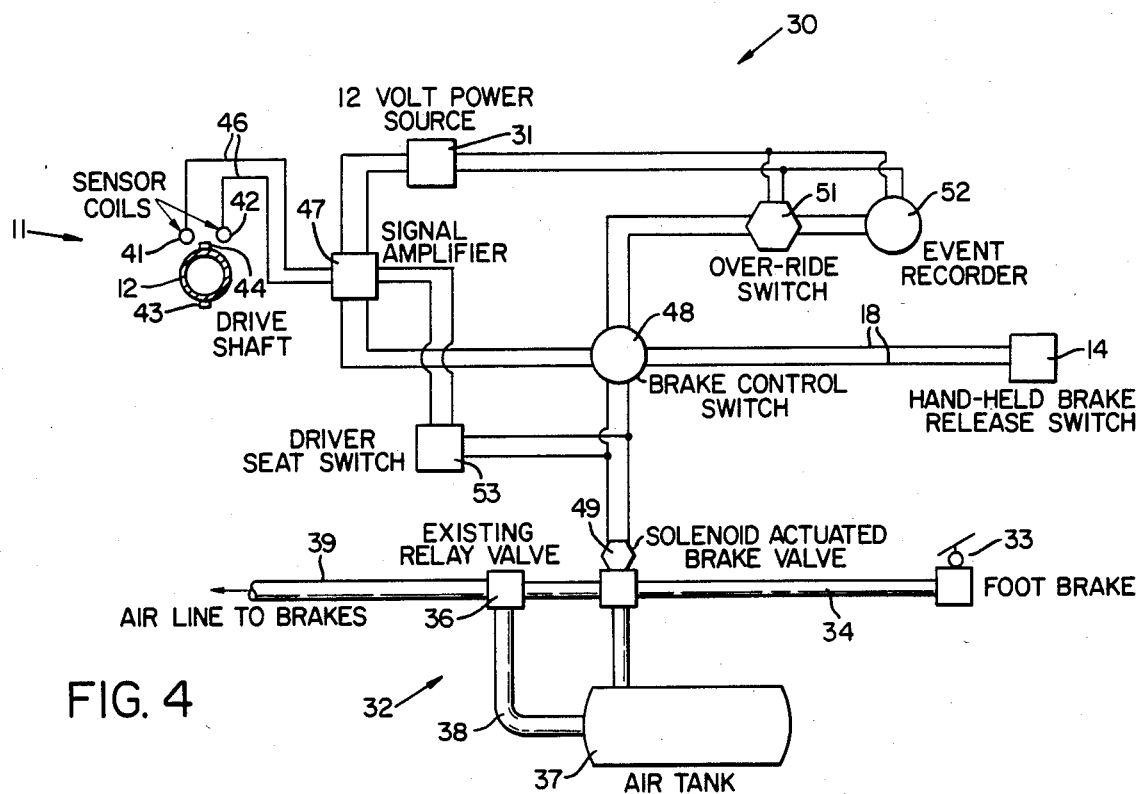
FIG. 4 is a simplified schematic diagram showing the basic components of the safety system, including the compressed air braking system.

FIG. 4 shows schematically the entire safety breaking system 30 of the invention. The system is tied into the vehicle's 12-volt power source 31 and existing air brake system generally indicated by the reference number 32, including a foot brake 33 connected by a line 34 to an existing relay valve 35, which admits air from a compressed air tank through lines 38 and 39 to the vehicle's brakes (not shown).

Motion of the vehicle is sensed through rotational motion of the drive shaft 12 by the motion sensing subsystem 11. Sensor coils 41 and 42 sense the rotation and direction of rotation of the drive shaft 12, upon which are mounted a pair of permanent magnets 43 and 44. The permanent magnets supply the magnetic field that activates the coils 41 and 42 to sense the motion and direction of motion. Wire leads 46 go to a signal amplifier 47 connected to the power source 31 and other components of the system 30.

The hand-held brake release switch is indicated at 14 in FIG. 4, connected to an internal brake control master switch 48, a double-throw relay switch. The control switch 48 is also connected to the signal amplifier 47, and if the signal amplifier indicates that the vehicle is moving backward, the brake control switch 48 will send a signal to a solenoid actuated brake valve 49 to immediately release pressure to the existing relay valve 36 to release air pressure to the brakes to lock them and hold them. However, if either the attendant's hand-held brake switch 14 orr a driver's override switch 51 is activated, the master brake control relay switch 48 will not apply the brakes, for the duration of the activation of the switch 14 or 51. If they have already been applied by the automatic system, the switch 14 or 51 will release them.

The driver's override switch 51 is to be used only when necessary and not to defeat the purpose of the system, which normally requires the hand-held switch 14 to be activated. For this purpose, the system includes an event recorder 52 connected to the power supply 31 and to the override switch 51 for recording all instances of and duration of uses of the override switch 51.

An additional subsystem includes a driver seat switch 53 for applying the brakes independently of the override switch 51. This occurs whenever the motion detection system 11 indicates through the signal amplifier 47 that the vehicle is moving backward or forward less than predetermined speed or is stationary, and the weight of the driver is removed from the driver'seat. The seat switch subsystem prevents runaways when the driver is not in control. The predetermined limit (e.g. 3 to 5 miles per hour) in the forward direction for operation of this subsystem is to prevent a safety hazard that would result from the sudden locking of the brakes, for any reason including malfunction, while the vehicle is moving forward at a relatively high rate of speed. This is preferably part of a safety shutoff for the entire system during forward movement above the predetermined speed, for preventing any automatic braking at higher speeds, to minimize the danger of inadvertent brake locking due to any form of malfunction.

Figure 5:
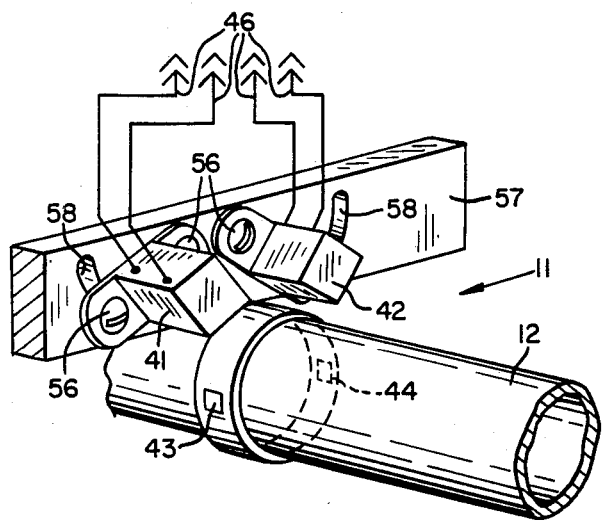
FIG. 5 is an enlarged view in perspective showing a magnetic pick-up assembly associated with the vehicle's drive shaft for detecting both forward and reverse motion of the vehicle.

Vehicle Motion Sensing Subsystem:

FIG. 5 shows the motion sensing subsystem 11 in greater detail. Bolts 56 anchor the two coils 41 and 42 to a mounting bar 57 attached to vehicle structure adjacent to the drive shaft 12. Slotted openings 58 in the bar 57 permit adjustment of the coils 41 and 42 to accommodate drive shafts of different diameters. The lead wires 46 from the coils extend to the signal amplifier 47 as indicated in FIG. 4 discussed above. The sensor coils are mounted with the central axis of each coil perpendicular to a radial line from the drive shaft 12 through the coil, i.e. parallel to a tangent to the adjacent edge of the drive shaft. The clearance between the drive shaft surface on which the magnets 43 and 44 are mounted and the surface of the coil housing 41 or 42 should be between about ⅜ inch and ½ inch.

Figure 6:
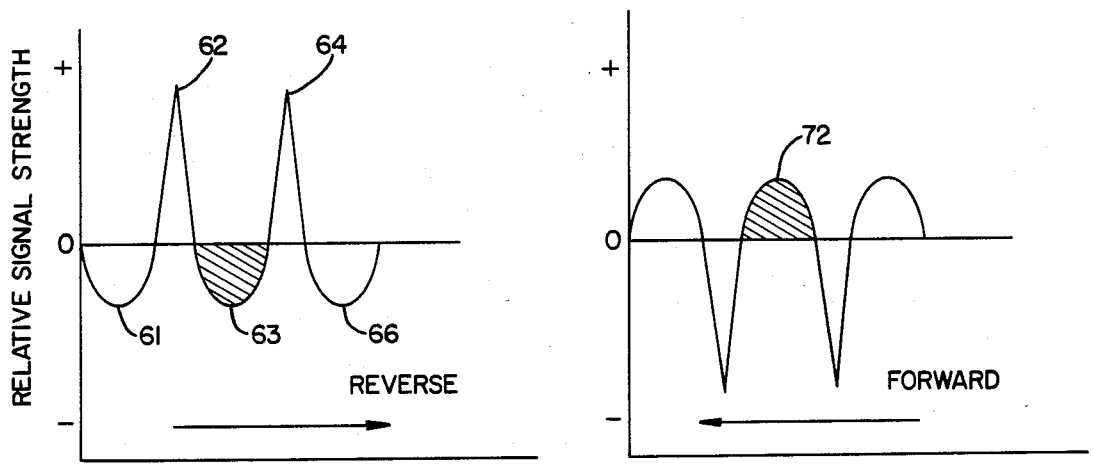
FIG. 6 is a graph of relative signal strength versus motion, relating to the operation of the magnetic motion pick-up device of the invention.

The signals from the coils 41 and 42, for forward and reverse rotation of the drive shaft, are indicated in the graphs of FIG. 6. The arrows indicate the direction of motion of the magnet along the top of the drive shaft as viewed from the rear of the vehicle. In the reverse motion, the first negative lobe 61 is developed as the magnet approaches the coil in the direction of the arrow. The following sharp positive pulse 62 occurs as the magnet passes directly beneath the left coil 41. The second negative lobe 63 occurs as the magnet is leaving the left coil 41. A simultaneous negative lobe occurs as the magnet approaches the right coil 42, with the shaded area of the lobe 63 representing the simultaneous negative signals. The second sharp positive pulse 64 occurs as the magnet passes directly beneath the right coil 42. The final negative lobe 66 occurs when the magnet is leaving the right coil 42.

The same pattern is duplicated when the second magnet passes beneath the two coils, and the use of two magnets is effective to reduce the stopping distance of the system 30 of the invention.

Figure 7:
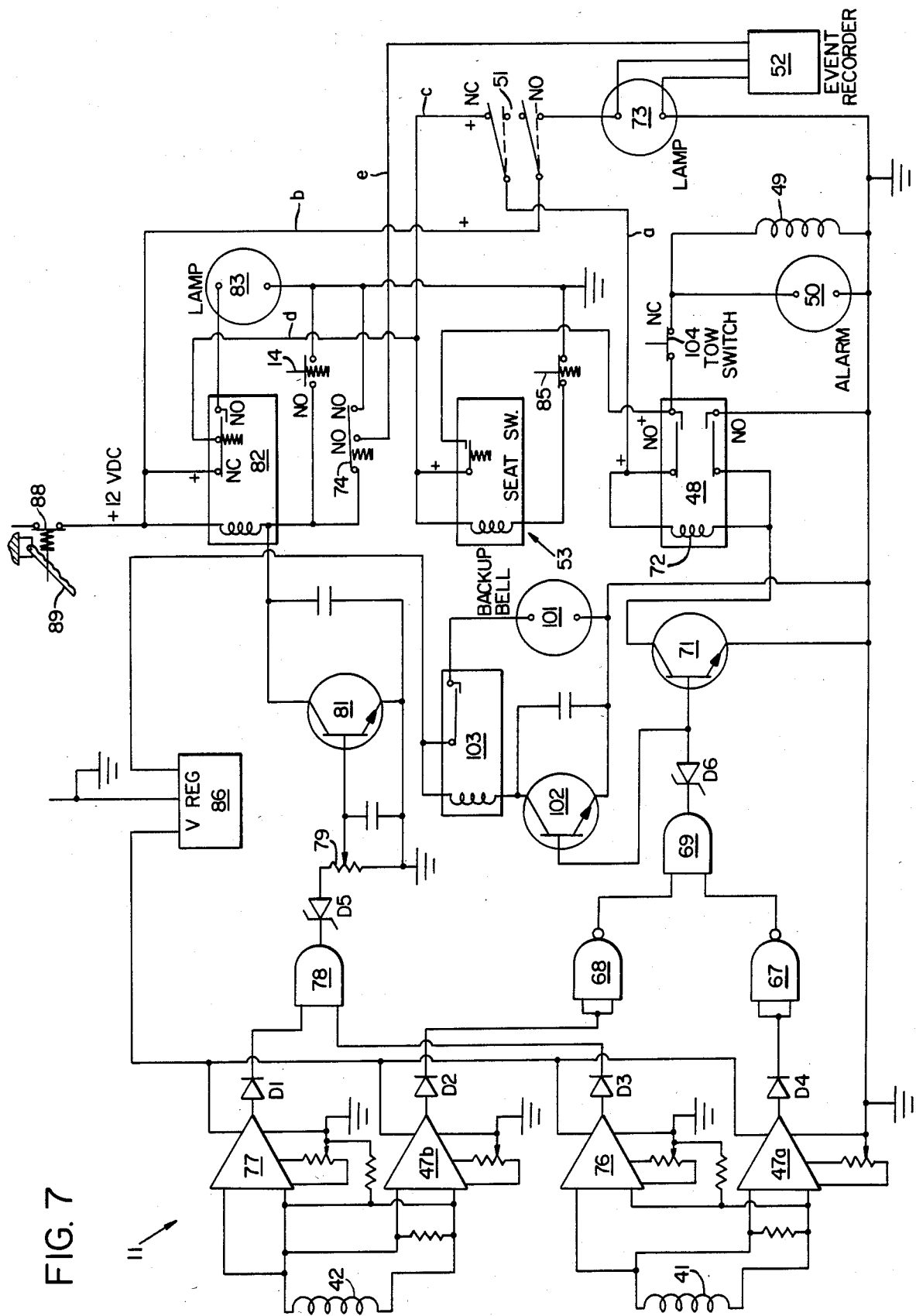
FIG. 7 is a schematic diagram showing the electrical circuitry of the system.

As shown in the circuit diagram of FIG. 7, amplifiers 47a l and 47b connected to the sensor coils 41 and 42 are biased (no signal input) so that the input to NAND gates 67 and 68 are high. The simultaneous negative pulses 63 (FIG. 6) to the amplifiers cause the inputs to the NAND gates to go low, resulting in high outputs from them. These high outputs are then fed to an AND gate 69, causing its output to go high. This output is fed to a transistor 71, causing it to conduct sufficient current to operate the brake relay control switch 48 (see also the schematic of FIG. 4). In turn, the relay 48 energizes the solenoid actuated brake value 49 and an audible alarm 50.

Upon reversing the direction of motion (to the forward direction), the polarity of the signal is reversed. The shaded portion 72 in the "forward" side of FIG. 6 now represents the simultaneous positive pulses. Under this condition, the brake relay control switch 48 is not activated. The simultaneous positive pulses 72 and simultaneous negative pulses 63 are uniquely related to the forward and reverse motions of the vehicle, respectively.

Brake Release:

When the brake relay control switch 48 is closed, a second set of contacts, the lower of the two sets shown in FIG. 7, connects the relay coil 72 to the 12-volt supply directly so that the brakes remain set until the voltage to the relay coil is interrupted by one of two means. These are the cab override switch 51 and the hand-held remote control brake switch 14, which in the preferred embodiment is connected to the retractable cord 18 (FIGS. 2 and 4) and is located at the rear of the vehicle. The double-throw toggle type driver's override switch 51, located in the cab near the driver opens the normally closed upper set of contacts in FIG. 7 to cut off the 12-volt supply to the relay switch 48, thus opening the braking circuit. A red light 73 on the driver's override switch is illuminated when the switch is activated, via closing of the lower set of contacts in FIG. 7. Also, a signal is sent by this circuit to the event recorder 52, which records the date and the time when the switch 51 is moved to the "ON" or "OFF" position, thereby giving information on the date, time and duration of activation of the switch 51.

By opening the power supply line to the brake relay 48, the override switch releases the brakes by cutting off power to the valve solenoid coil 49, and also cuts off power to the relay coil 72, resetting the relay 48 even if the override switch 51 is used only momentarily, and restoring the two sets of contacts to their normally open position. Rearward motion of the truck sets the brakes and holds them set until the relay 48 is reset by cutoff of power through a power lead a, which may be only a momentary cutoff of power.

In the override switch 51, a constant power supply is delivered to the lower, manually open set of contacts through a power lead b, so that any time the switch 51 is thrown it is recorded by the event recorder 52 and indicated by the red lamp 73, regardless of the setting of any other switch. However, the upper set of contacts of the switch 51 is supplied by a different lead c, which is fed by a lead d passing through the hand-held switch 14 assembly. Thus, the two switches are in series so that the opening of either will interrupt power to the relay 48, releasing the brakes and resetting the relay 48.

The override switch 51 would be used if the driver is alone or if the vehicle rolls back locking the brakes on an incline and no further backing is required, such as at an intersection in normal driving.

An optional feature of the system of the invention is the provision of a spring-loaded test switch 74, normally open, in parallel with the attendant's switch 14, to operate the same relay 82 for release of automatic braking. This enables the driver at the start of his shift to back the vehicle slowly until the brakes lock to test the system, then push the test button 74 to reset the system. The switch 74 should be located in a place inconvenient to the driver in backing so he will not use it to defeat the purpose of the system. Preferably, the test or reset switch 74 is a double-contact switch as shown, with one contact leading via a line e to the event recorder, at a different input from that which records the use of the driver's override switch 51. The test or reset switch 74 is pushed only momentarily and its use is recorded by the event recorder to indicate the driver has tested the system at the start of his shift, as he should.

The hand-held attendant's switch 14 is the other means of releasing the brakes or preventing their being set automatically. If the vehicle is backing with the braking circuit disabled by the hand-held switch 14, the brakes can be set immediately by releasing the spring-loaded normally open switch 14. The small distance travelled after releasing the switch is a function of vehicle speed and the time required to bleed air from the air brake system 32 (FIG. 4), as well as the position of the permanent magnet 43 or 44 relative to the sensor coils (FIGS. 4 and 5) at the time of the switch release. As indicated in FIG. 7, the hand-held switch 14 may operate through a relay 82, the switch 14 being normally open and the relay 82 (left contacts in FIG. 7) being normally closed. A normally open set of contacts in the relay is closed to light an indicator lamp 83 showing that the automatic braking system is disabled. The switch 14 can alternatively be normally closed, without a relay.

Safety Aspects:

There is a remote possibility, due to component failure or other reasons, that the brakes would be set inadvertently while the vehicle is in forward motion. To minimize this possibility, the simultaneous positive pulses 72 (FIG. 6) are employed to disable the braking system while the vehicle is in forward motion above some predetermined slow speed, such as 3 to 5 miles per hour. Referring to FIG. 7, amplifiers 76 and 77 connected to the sensor coils 41 and 42 are biased so that their outputs are zero with no signal applied to their inputs. When the simultaneous positive signals are applied to the amplifiers 76 and 77, their outputs go high and are fed to a dual input AND gate 78. The high output from the AND gate 78 is fed through a resistance-capacitance circuit 79 to a transistor 81, thus activating the relay 82. This disables the braking circuit and causes the indicator lamp 83 to be illuminated. The lamp 83 acts as a "proceed" lamp to the driver. The resistance in the circuit controlling the transistor 81 can be adjusted to set the predetermined forward speed at which the relay 82 is activated. If the lamp 83 is not illuminated at the predetermined speed, the driver should proceed with caution (preferably driving with the cab override switch 51 activated) and have the system checked as soon as possible.

Event Recorder:

It is important that the precise times when the cab override switch 51 is activated or deactivated be known. This gives an indication of the proper use or improper use of the system, in case of an accident. A computer with a built-in time clock may form a part of the event recorder 52, which is indicated by a box in FIG. 7. The computer is programmed to record in memory the date and time when the override is activated or deactivated, with sufficient memory to record a large number of entries for "ON" and "OFF" switch positions. The data can be printed out on demand. A sample of the data printout and the computer program are indicated below:

| TRUCK NO. = 123 | | DATA INPUT PROGRAM |
|---|---|---|
| READING TIME IS | | |
| 30115.4016 | | |
| * * * * * * * * | | 10: "ON" |
| ON | 30115.3712 | 20: CLEAR |
| OFF | 30115.3719 | 30: DIM C(90), D(90) |
| ON | 30115.3721 | |
| OFF | 30115.3726 | 40: LET I=1 |
| ON | 30115.3732 | 50: STOP |
| OFF | 30115.3735 | 60: LET C(I)=TIME |
| ON | 30115.3739 | 70: STOP |
| OFF | 30115.3744 | 80: LET D(I)=TIME |
| ON | 30115.3749 | 90: IF I=90 THEN |
| OFF | 30115.3753 | LET I=0 |
| ON | 30115.3758 | 94: LET I=I+1 |
| OFF | 30115.3803 | 100: GOTO 50 |
| ON | 30115.3809 | |
| OFF | 30115.3815 | |
| ON | 30115.382 | PRINT DATA PROGRAM |
| OFF | 30115.3825 | |
| ON | 30115.3828 | |
| OFF | 30115.3834 | |
| ON | 30115.3839 | 120: INPUT "ENTER |
| OFF | 30115.3843 | TRUCK NO."; TR |
| ON | 30115.385 | 130: LPRINT "TRUCK |
| OFF | 30115.3855 | NO.="; TR |
| ON | 30115.39 | 140: LPRINT "READING |
| OFF | 30115.3903 | TIME IS "; |
| ON | 30115.3907 | TIME |
| OFF | 30115.391 | 150: LPRINT "* * * |
| ON | 30115.3916 | * * * * * *" |
| OFF | 30115.3918 | 160: LET I=1 |
| ON | 30115.3923 | 170: LPRINT "ON"; C |
| OFF | 30115.3926 | (I) |
| ON | 30115.393 | 180: LPRINT "OFF"; D |
| OFF | 30115.3933 | (I) |
| ON | 30115.3937 | 190: IF C(I)=0 AND D |
| OFF | 30115.3939 | (I)=0 THEN 210 |
| ON | 30115.3944 | 192: IF I=90 THEN 210 |
| OFF | 30115.3946 | |
| ON | 30115.3951 | 194: LET I=I+1 |
| OFF | 30115.3956 | 200: GOTO 170 |
| ON | 0 | 210: LPRINT "END OF |
| OFF | 0 | DATA"; LF 3 |
| END OF DATA | | 220: END |

Figure 8:
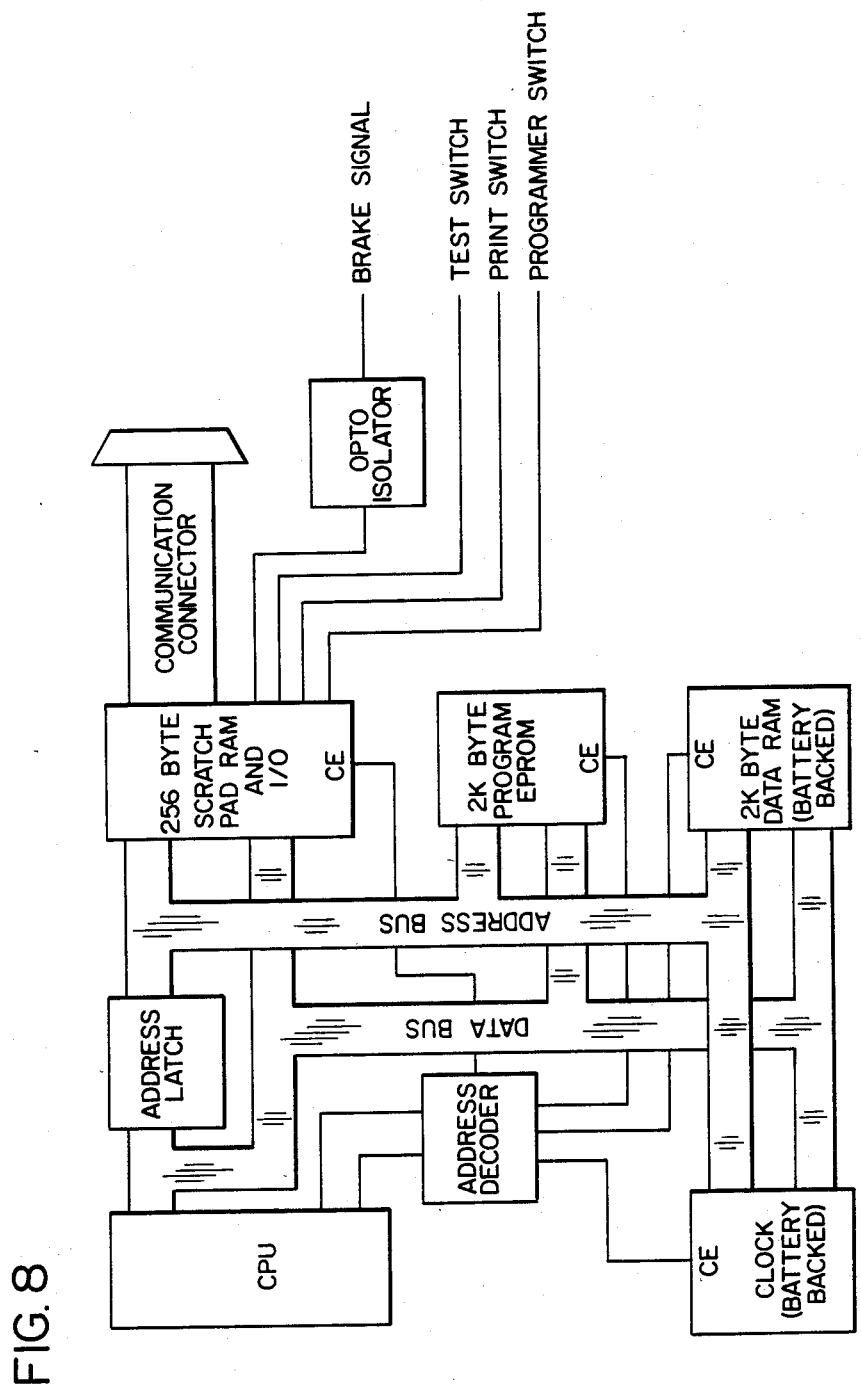
FIG. 8 is a block diagram indicating the computer memory associated with an event recorder of the system.

The processor comprises a computer chip and associated components mounted on a printed circuit board so that the unit will be contained within one package, with connectors that permit programming and printing. Circuitry for the processor is shown in the block diagram of FIG. 8. The circuitry includes a back-up battery that will ensure that the data are maintained in memory even if the vehicle power supply fails.

Driver's Seat Switch "Runaway" Feature:

The driver's seat of the vehicle 10 is equipped with the seat switch 53 as mentioned above in connection with FIG. 4, for preventing vehicle runaway accidents when the driver is out of the vehicle. The seat switch assembly 53, which may include a spring-loaded normally open switch 85 as in FIG. 7, is shown closed because this is the position it is in when the system is in operation with a driver at the wheel. The switch 85 may be a simple limit switch, or it may alternatively be a capacitance sensor system for detecting the presence of a driver without any physical contact with a switch. It may also be a simple normally closed limit switch, with no relay.

If the driver leaves the seat while the vehicle is stationary or moving forward slowly (below the predetermined forward speed at which the brake relay 48 is disabled), the brake relay switch 53 closes and energizes the brake valve solenoid 49 to apply the brakes, bypassing the brake relay 48. If the driver leaves the seat while the vehicle is in reverse motion, the brakes again will be applied, even if the brake relay 48 has been deactivated by the driver's override switch 51. Only if the relay 82 is opened will the seat switch be ineffective. The relay 82 may be open due to the vehicle's moving forward above the preset speed, as discussed above, or due to the attendant's hand-held switch being activated, since the seat switch assembly 53 receives its power through the relay switch 82. The latter instance is unlikely to coincide with the driver's leaving the seat.

Voltage Supply:

The motion detection system of the invention operates entirely from the 12-volt battery. The solid-state system is operated through an on-board voltage regulator 86, which maintains a constant voltage even though the battery voltage varies with charging rate and current drain. Transient suppressors placed across the input and output give protection against voltage peaks, which can occur for a number of reasons. The small on-board back-up battery ensures that data will not be lost from memory if the vehicle battery fails.

Hand Brake Deactivation:

Because the vehicle may be idle for days at a time under some circumstances, the system may optionally include a master power switch 88 that is normally closed but opened when the vehicle's hand brake 89 is fully engaged. This avoids battery drain due to continuous long-term activation of the brake valve solenoid 49 through the seat switch assembly. However, if the brake alarm 50 is included, it will alert the driver to the fact that the automatic braking is being applied as he leaves the seat, so that he could ordinarily use the override switch 51 to deactivate the system even without the master switch 88.

Back-up Bell Subsystem:

Utility trucks usually have a back-up bell or alarm that sounds its audible warning whenever the truck is in reverse gear, through a sensor associated with the transmission. As an optional feature of the system of the invention, as shown in FIG. 7, the vehicle's back-up alarm 101 (or an added alarm 101) may be wired to sound whenever the vehicle is moving backward whether or not in reverse gear. For this purpose, the back-up alarm 101 may be connected to the motion detection system 11 via a transistor 102 without the hold-down feature. This subsystem takes advantage of the reverse motion sensing feature already included in the system and more reliably sounds a warning whenever the veicle moves backward. As soon as backward motion ceases, the alarm 101 is deactivated.

Towing Switch Deactivation:

A further deactivation switch 104, normally closed as indicated, preferably is included in the system to shut off the automatic braking system for towing of the truck, with no driver present. The switch 104 is key-operated, requiring a key to be inserted and turned to deactivate the system.

Runaway Subsystem Alone:

In FIG. 9 is shown the circuitry of a runaway subsystem 100 alone according to the invention, including many of the same components present in the overall system 30. The runaway system 100, sensitive to the driver's presence or absence in the driver's seat, includes the seat switch assembly 53, the relay 82 and the motion detection subsystem 11 with sensor coils 41 and 42, but does not include any hand-held switch or manual override device or event recorder. It includes detection of rearward movement, but not for automatic brake actuation, only for actuating a back-up alarm 101. As above, in the forward motion the output from the AND gate 78 is fed through the resistance-capacitance circuit 79 to the transistor 81, activating the relay 82 whenever the vehicle is moving forward faster than the preset speed (e.g. 3 to 5 mph). This energizes the lamp 83 in the cab of the vehicle, indicating disabling of the system, as above.

Unless the disabling relay 83 is energized, the brakes will be applied whenever the driver leaves the seat. This is accomplished by the seat switch assembly 53, connected to the brake valve solenoid 49, as described above. As mentioned above, the seat switch 85 itself may be a simple limit switch or a more sophisticated sensor of the driver's presence, without physical contact with any switch.

For activation of the back-up alarm or bell 101 whenever the vehicle is moving backward whether in reverse gear or not, the system 100 may include the transistor 102 connected to the relay switch 103 leading to the alarm 101, similarly to that portion of the circuit described above. This is the only purpose of back-up sensing in the runaway protection system 100.

The system 100 also includes the key-operated towing switch 42 for disabling the system in towing, as above.

As also described above, the system 100 may include some form of master switch 88 for de-energizing the entire system during periods when the vehicle will not be in use for some time, to prevent draining of the battery. For this purpose, the switch 88 may be connected to the vehicle's hand brake 89. When the hand brake 89 is set, the system 100 is not needed and power drain is avoided.

The runaway prevention system 100 may be incorporated in nearly any motorized vehicle, particularly service vehicles such as trucks, to prevent the vehicle's rolling away when it is left without the hand brake properly set.

The preferred embodiment described herein is intended to be purely illustrative, and not limiting of the scope of the invention. Other embodiments and variations will be apparent to those skilled in the art and may be made without departing from the essence and scope of the invention as defined in the following claims.

We claim:

1. A safety back-up system for a vehicle, to stop the vehicle against reverse movement when the rear of the vehicle is unattended, comprising:

motion-sensing means connected to the vehicle for detecting rearward movement of the vehicle;

braking means for automatically applying and locking the vehicle's brakes in response to the detection of rearward movement of the vehicle by the motion-sensing means; and interrupt means for disabling the braking means in response to and for the duration of application of a manual input by an observing person positioned near the rear of the vehicle, while leaving the vehicle's manual braking system operable;

whereby the observing person is normally required to be in the vicinity of the rear of the vehicle, for the vehicle to be capable of moving backward.

2. The safety back-up system of claim 1, further including driver override means operable by the vehicle's drivr, for enabling the driver to override the braking means from inside the vehicle when necessary.

3. The safety back-up system of claim 2, further including recording means in the vehicle for recording all instances and duration of the driver's use of the manual override means.

4. The safety back-up system of claim 1, wherein the interrupt means includes a hand-held switch operable by the observing person from behind the vehicle, having an electrical cord leading back to the vehicle, and reel means for recoiling cord as the observing person replaces the hand-held switch on the vehicle.

5. The safety back-up system of claim 1, wherein the interrupt means includes a hand-held radio signal transmitter to be held by the observing person and a signal receiver mounted at the rear of the vehicle, so that manual operation of the signal transmitter by the observing person is effective to activate the interrupt means to permit reverse movement.

6. The safety back-up system of claim 5, wherein the signal transmitter and signal receiver include means for substantially preventing their operation to activate the interrupt means except when the transmitter is near the rear of the vehicle.

7. The safety back-up system of claim 1, further including means associated with the motion-sensing means for detecting forward movement of the vehicle, and including system disabling means for de-energizing the system to prevent automatic brake operation whenever the vehicle is moving forward faster than a preselected speed.

8. The safety back-up system of claim 7, wherein said preselected speed is between about 3 and 5 miles per hour.

9. The safety back-up system of claim 7, further including switch means associated with the driver's seat of the vehicle for sensing the presence of a driver and for causing the vehicle's brakes to be engaged whenever the driver leaves the seat while the vehicle is stationary, moving slowly forward below said preselected speed, or moving in reverse.

10. The safety back-up system of claim 1, further including means associated with the motion-sensing means for detecting forward motion of the vehicle, and including switch means for sensing the presence of a driver and for causing the vehicle's brakes to be engaged whenever the driver is absent while the vehicle is stationary, moving slowly forward, or moving in reverse.

11. The safety back-up system of claim 1, wherein the motion-sensing means comprises at least one permanent magnet mounted on the outside of the vehicle's drive shaft, and a pair of coils mounted on the vehicle adjacent to the path of the magnet, the moving magnet providing a magnetic field that activates the coils to create signals, and means for interpreting the signals and for actuating said braking means when rearward movement of the vehicle is detected.

12. The safety back-up system of claim 11, wherein the motion-sensing means further includes means associated with said interpreting means for detecting forward movement of the vehicle below a predetermined speed, and the system further including switch means in the vehicle for detecting the presence of a driver in the vehicle and for causing the vehicle's brakes to be applied whenever the driver is absent while the vehicle is stationary, moving slowly forward below said predetermined speed, or moving backward.

13. A vehicle runaway protection system for automatically applying the vehicle's brakes whenever the vehicle's driver is absent, whether the vehicle is stationary, moving slowly forward or moving backward, comprising:

means for connecting the system to power from the vehicle's battery;

motion-sensing means connected to the vehicle for detecting movement of the vehicle and for determining in particular whether the vehicle is moving forward faster than a predetermined speed;

switch means associated with the driver compartment of the vehicle for sensing the absence of the driver and for sending a signal whenever the driver is absent; and brake-applying means connected to the motion-sensing means and to the switch means for automatically applying the vehicle's brakes whenever (a) the driver is absent, as determined by the switch means, (b) the vehicle is stationary, moving backward or moving forward not exceeding said predetermined speed, as determined by the motion-sensing means, and (c) power is provided to the system by said connecting means, including system disabling means for de-energizing the system to prevent automatic application of the brakes whenever the vehicle is moving forward faster than said predetermined speed;

whereby the brakes are normally automatically applied if the driver is absent except when the vehicle is moving forward above said predetermined speed.

14. The system of claim 13, further including key switch means for disconnecting said connecting means in the event the vehicle is to be towed.

* * * * *